H. K. MOORE AND G. A. RICHTER.
METHOD FOR MAKING CARBON BISULFID.
APPLICATION FILED NOV. 21, 1917.

1,312,800.

Patented Aug. 12, 1919.

Inventors:
Hugh K. Moore,
George H. Richter,

H. K. MOORE AND G. A. RICHTER.
METHOD FOR MAKING CARBON BISULFID.
APPLICATION FILED NOV. 21, 1917.

1,312,800. Patented Aug. 12, 1919.
2 SHEETS—SHEET 2.

Inventors:
Hugh K. Moore,
George A. Richter,
by Wright Brown Quimby May
Attorneys.

UNITED STATES PATENT OFFICE.

HUGH K. MOORE AND GEORGE A. RICHTER, OF BERLIN, NEW HAMPSHIRE, ASSIGNORS TO BROWN COMPANY, OF BERLIN, NEW HAMPSHIRE, A CORPORATION OF MAINE.

METHOD FOR MAKING CARBON BISULFID.

1,312,800.  Specification of Letters Patent.  Patented Aug. 12, 1919.

Application filed November 21, 1917. Serial No. 203,224.

*To all whom it may concern:*

Be it known that we, HUGH K. MOORE and GEORGE A. RICHTER, citizens of the United States, residing at Berlin, in the county of Coos and State of New Hampshire, have invented new and useful Improvements in Methods for Making Carbon Bisulfid, of which the following is a specification.

This invention has for its object the production of carbon bisulfid ($CS_2$) by the reaction of carbon and sulfur under proper temperature conditions.

On the accompanying drawings,—

Figure 1:
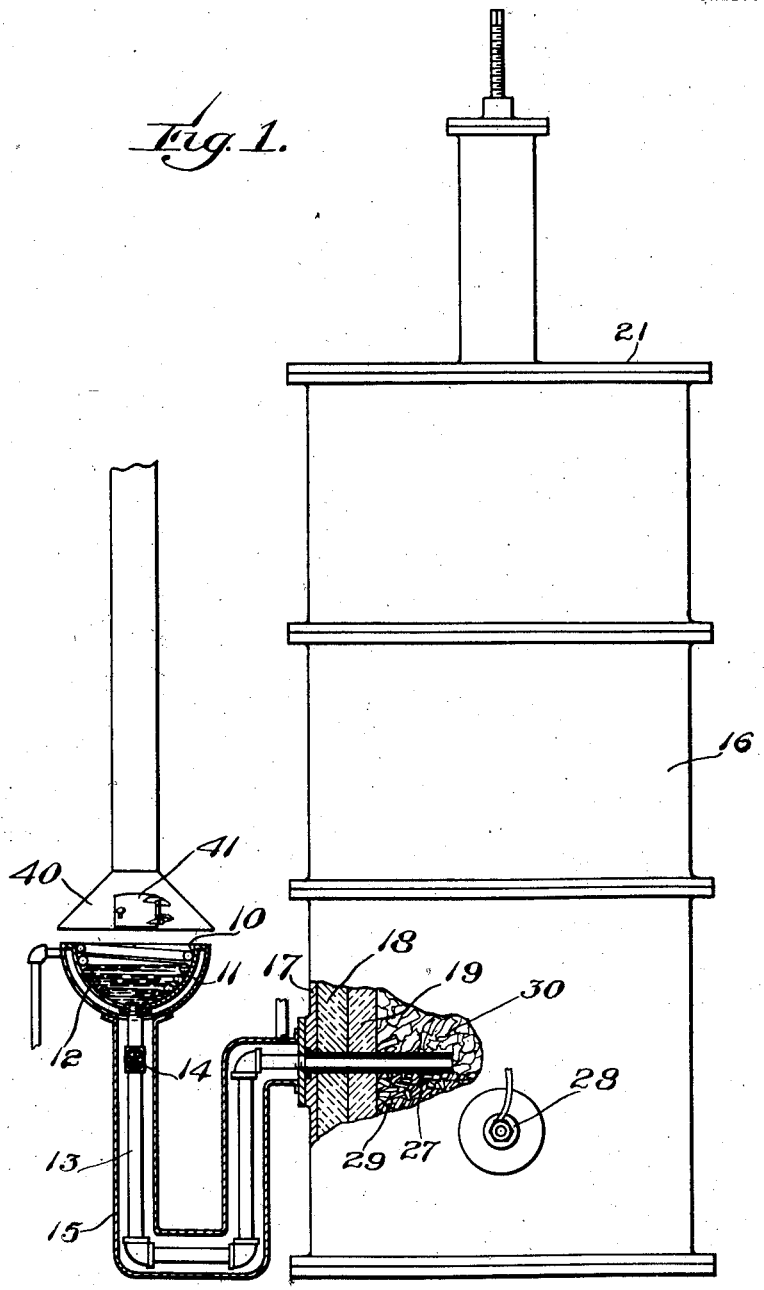
Figure 2:
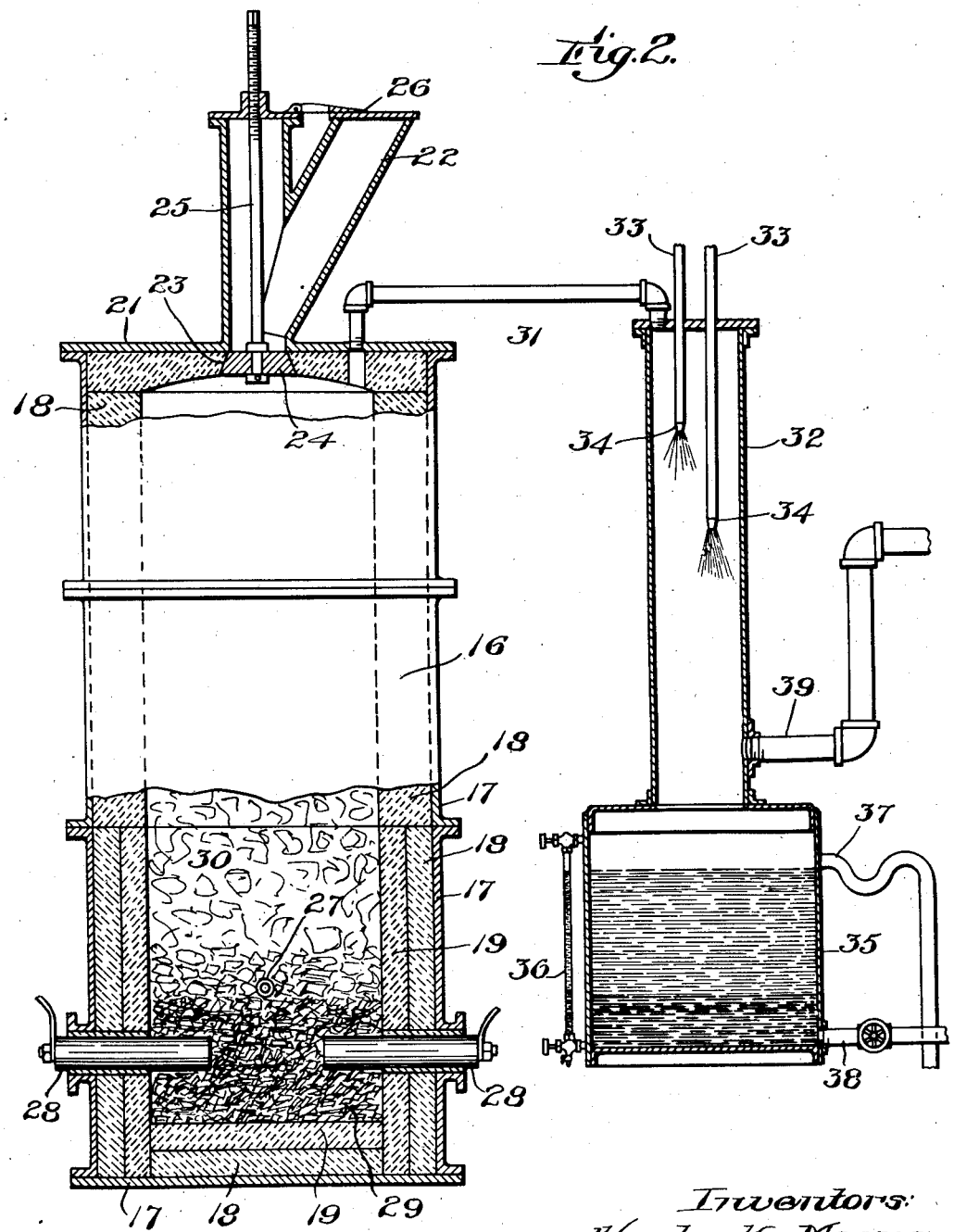

Figure 1 represents a kettle for melting sulfur and the connections leading therefrom to the furnace; and Fig. 2 represents the furnace, the condenser and the several conduits connected therewith.

The instrumentalities employed comprise a steam-heated kettle in which the sulfur is melted and liquefied, an electric furnace in which the sulfur is vaporized and the charcoal is heated, one in the presence of the other to bring about a reaction between them, and a condenser and a separator in which the carbon bisulfid is condensed and recovered. The molten sulfur is supplied in a constant stream to the furnace, steam-jacketed connections between the kettle and the furnace serving to keep the sulfur in liquid condition. The carbon bisulfid gas is delivered continuously from the furnace to the condenser, where it is condensed by the direct action of and contact with water, and in the lower portion of which it is collected and withdrawn as desired.

Referring to the drawings,—a kettle for melting the sulfur is indicated at 10. It is provided with a steam jacket 11 to which steam under pressure is admitted to supply sufficient heat to melt the sulfur and maintain it at a temperature of approximately 140° C. The interior of the kettle is supplied with a steam coil 12 to assist in melting the charge of sulfur. A conduit 13 leads from the bottom of the kettle to the furnace, and is supplied with a valve 14 by which the flow of sulfur may be controlled or cut off as desired. The conduit, including the necessary elbows or couplings and the valve, are all incased within a steam jacket, indicated conventionally at 15 to keep the sulfur in a liquid condition during its passage from the kettle to the furnace. The jackets are preferably welded and capable of standing relatively high steam pressure.

The furnace is indicated at 16 and it is illustrated as consisting of a series of cylindrical sections one placed above the other. Each section comprises an outer metallic shell 17, a fire-brick lining 18, and in the lower section an inner course 19 of magnesia brick to withstand the high temperatures. The linings are preferably quite thick. For example, in a construction having an outside diameter of six feet, the internal diameter may be approximately four feet. The lower section is provided with a suitable bottom 20, and the upper section has a top 21 with a feed chute 22 by which charcoal may be supplied to the furnace as hereinafter described. The top has an aperture 23 to which is fitted a closure 24 on the lower end of a threaded stem 25 projecting through the top of the feed chute casing, by which the closure may be forced downward to position to permit the introduction of the charcoal into the furnace. The feed chute has a hinged door 26 which is normally closed. Through the lower section of the furnace is passed a graphite tube 27 to which the conduit 13 is connected and which delivers the stream of sulfur to the furnace at a point to be described hereinafter. We have found that a tube of this description is relatively unattacked by the sulfur vapors. Electrodes 28, 28, are passed laterally into the lower section of the furnace and they are insulated from the shell by stuffing boxes of insulating material capable of withstanding the high temperatures to which they are exposed. Graphite bars, cylindrical in form and arranged end to end as indicated, are employed as the electrodes. The lower portion of the furnace is filled with broken carbon 29 to a level somewhat above the electrodes. As a matter of practice, we find that carbon electric light pencils, broken into short pieces, serve the purpose very well. Above the carbon the furnace is filled with wood charcoal 30. In Fig. 2, it will be observed that the sulfur supply tube 27 is preferably arranged to deliver the stream of sulfur at a point above the electrodes and between the inner ends thereof, though this is not essential. The graphite electrodes are arranged in a circuit to receive a current of low voltage and high amperage, e. g. 55 volts and 1000 to 1500 amperes, as a result of which sufficient heat is generated within the furnace to vaporize the sulfur and bring it to the temperature required for reaction with the carbon of the charcoal to form carbon bisulfid. This temperature is about 1000° C. The gas thus formed is led from the top of the furnace by a conduit 31 to a condenser 32 now to be described.

The condenser 32 consists of an upright cylindrical casing to the upper end of which one or more water pipes are led. As illustrated, there are two pipes 33, 33, each having a nozzle 34, and the nozzles are arranged at different elevations. Nozzles or spray jets of any suitable character are employed which will deliver the water in a fine spray. The lower end of the condenser is connected with a recovery or collecting tank 35, having a vertical gage glass 36 and having an outlet pipe 37 for water at one elevation, and a valved outlet pipe 38 at the bottom for the condensed carbon bisulfid. To carry away the uncondensed gases, chiefly hydrogen sulfid, a conduit 39 is connected to the lower end of the condenser just above the tank 35.

Above the sulfur melting kettle 10 for carrying away the fumes, there is a hood 40 having a door 41 which may be opened for inspecting the contents of the kettle.

In operation, the lower portion of the furnace is filled with carbon such as described, which has been carefully dried, up to the level of the sulfur supply tube 27, and the charcoal, which has been likewise dried, is fed through the feed chute 22, and the cover on the latter closed, after the closure or door 24 has been secured in position. The sulfur, which has been melted and kept molten in the kettle 10, is permitted to flow slowly into the furnace, after the electric current has been supplied to the electrodes long enough to bring the charcoal to the required temperature. The sulfur is vaporized and the vapors react with the charcoal. The $CS_2$ thus formed passes through the conduit 31 to the condenser, where it is subjected to the condensing action of cold water delivered by the nozzles 34, 34. The water and products of condensation pass into the tank until the water reaches the level of the trapped outlet pipe 37, and thereafter the water flows continuously through said pipe. The condensed carbon bisulfid gradually accumulates in the lower portion of the tank as indicated by the gage glass, and successive charges may be drawn off through the valved pipe 38, or else the valve of such pipe may be adjusted to permit a continuous overflow of the product at the same rate at which it is formed.

We have secured excellent results with an apparatus such as described, in which the furnace is approximately fourteen feet high and six feet outside diameter, and the electrodes approximately six inches in diameter. A condenser eight feet in height connected to a tank four feet high and four feet in diameter is adequate in size for the purposes described. We regard it as very desirable to have the sulfur melting kettle removed laterally from the furnace and connected thereto by a valved pipe, and to heat the kettle and the connections by steam, as we are thereby enabled accurately to control the temperature and to control the feeding of the sulfur.

The various parts are shown somewhat conventionally and we have not attempted to illustrate them in their exact relative dimensions or at their exact locations.

Having thus explained the nature of our said invention and described a way of making and using the same, although without attempting to set forth all of the forms in which it may be made or all of the modes of its use, what we claim is:

1. In the manufacture of carbon bisulfid, continuously vaporizing sulfur in the presence of heated charcoal to cause a reaction, condensing the carbon bisulfid by contact with a stream of water delivered in a jet or spray, collecting said water and the product of condensation, and continuously separating the condensed carbon bisulfid and the water.

2. In the manufacture of carbon bisulfid, continuously vaporizing sulfur in the presence of heated charcoal to cause a reaction, condensing the carbon bisulfid by contact with a stream of water delivered in a jet or spray, collecting said water and the product of condensation, and separately withdrawing the water and the condensed carbon bisulfid.

3. In the manufacture of carbon bisulfid, melting the sulfur, continuously feeding the molten sulfur, vaporizing such sulfur and bringing the vaporized sulfur into contact with heated charcoal to cause a reaction therewith, condensing the product of the reaction by the direct contact with water, collecting the water and the product of condensation, and continuously separating the water from the condensed carbon bisulfid.

In testimony whereof we have affixed our signatures.

HUGH K. MOORE.
GEORGE A. RICHTER.